(12) United States Patent
Kuskov et al.

(10) Patent No.: US 11,397,812 B2
(45) Date of Patent: Jul. 26, 2022

(54) SYSTEM AND METHOD FOR CATEGORIZATION OF .NET APPLICATIONS

(71) Applicant: AO Kaspersky Lab, Moscow (RU)

(72) Inventors: Vladimir A. Kuskov, Moscow (RU); Denis V. Anikin, Moscow (RU); Dmitry A. Kirsanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 982 days.

(21) Appl. No.: 16/134,208

(22) Filed: Sep. 18, 2018

(65) Prior Publication Data

US 2019/0243976 A1 Aug. 8, 2019

(30) Foreign Application Priority Data

Feb. 6, 2018 (RU) .......................... RU2018104434

(51) Int. Cl.
*G06F 21/56* (2013.01)
*G06F 21/53* (2013.01)
*G06F 21/51* (2013.01)

(52) U.S. Cl.
CPC ............ *G06F 21/568* (2013.01); *G06F 21/51* (2013.01); *G06F 21/53* (2013.01); *G06F 21/562* (2013.01); *G06F 2221/033* (2013.01); *G06F 2221/2149* (2013.01)

(58) Field of Classification Search
CPC ........ G06F 21/51; G06F 21/53; G06F 21/562; G06F 21/568; G06F 2221/033; G06F 2221/2149
See application file for complete search history.

(56) References Cited

U.S. PATENT DOCUMENTS

| 2005/0188272 A1* | 8/2005 | Bodorin ................ G06F 21/566 714/38.1 |
| 2015/0121449 A1* | 4/2015 | CP ......................... H04L 63/20 726/1 |

OTHER PUBLICATIONS

Microsoft, CLR Profilers and Windows Store Apps, https://docs.microsoft.com/en-us/dotnet/framework/unmanaged-api/profiling/clr-profilers-and-windows-store-apps, retrieved Sep. 15, 2021 (Mar. 30, 2017) (Year: 2017).*
Microsoft, Profiling Overview, https://docs.microsoft.com/en-us/dotnet/framework/unmanaged-api/profiling/profiling-overview, retrieved Sep. 15, 2021 (Mar. 30, 2017) (Year: 2017).*

* cited by examiner

*Primary Examiner* — Theodore C Parsons
(74) *Attorney, Agent, or Firm* — ArentFox Schiff LLP; Michael Fainberg (57) ABSTRACT

Disclosed herein are systems and methods of categorizing a .NET application. In one aspect, an exemplary method comprises, by a hardware processor of a security module, launching a CLR profiler upon launching of the .NET application, forming an execution log of the .NET application and adding information about events occurring during the execution of the .NET application via the launched CLR profiler, assigning to the .NET application, a category of a predetermined list of categories based on an analysis of the execution log of the .NET application, and determining whether the .NET application is categorized as being a malicious application.

15 Claims, 3 Drawing Sheets

SYSTEM AND METHOD FOR CATEGORIZATION OF .NET APPLICATIONS

CROSS REFERENCE TO RELATED APPLICATIONS

The present application claims benefit of priority under 35 U.S.C. 119(a)-(d) to a Russian Application No. RU 2018104434, filed on Feb. 6, 2018, the entire content of which is incorporated herein by reference.

FIELD OF TECHNOLOGY

The present disclosure relates to the field of computer security and, more specifically, to systems and methods for categorization of applications created using a .NET program platform.

BACKGROUND

Traditional analysis for detecting malicious software created with the use of the .NET program platform (.NET Framework) has low effectiveness. The applications created using the .NET program platform may be referred to as .NET applications. The analysis involves the detection of malicious applications on the basis of their behavior (for example, on the basis of the sequence of system calls performed—calls for system functions). The .NET platform itself consists of a CLR (Common Language Runtime) execution environment and a library of .NET Framework types (.NET Framework Class Library). When using an application code containing CIL (Common Intermediate Language) code, the CLR execution environment to which control is transferred, upon launching the application, performs a number of calls for system functions. Some of the system functions are related to the execution logic of the application, namely functions called from the CIL code of the machine code obtained during JIT (Just In Time) compilation, while functions are related to the internal processes of the CLR execution environment. Therefore, it is hard to make a decision as to the behavior of an application (such as whether or not the behavior is characteristic of malicious applications) simply by analyzing the log of calls for system functions, which can be obtained by various methods known from the prior art during the execution of the .NET application (more precisely, the process launched from such a .NET application), since such a call log will contain much "extraneous" information pertaining to the calls for functions not related to the execution logic of the application.

Publications that suggest using CLR profilers for other applications do exist. However, there are no known methods for effective categorization of a .NET application (including the detecting of malicious applications) based on the log of system functions performed during the execution of the code of the .NET application.

SUMMARY

Aspects of the disclosure relate to the field of categorization of applications created using the .NET program platform.

In one exemplary aspect, a method is implemented in a computer comprising a hardware processor, the method comprising: launching a CLR profiler upon launching of the .NET application, forming an execution log of the .NET application and adding information about events occurring during the execution of the .NET application via the launched CLR profiler, assigning to the .NET application, a category of a predetermined list of categories based on an analysis of the execution log of the .NET application, and determining whether the .NET application is categorized as being a malicious application.

According to one aspect of the disclosure, a system is provided for categorization of applications created using the .NET program, the system comprising a hardware processor configured to: launch a CLR profiler upon launching of the .NET application, form an execution log of the .NET application and add information about events occurring during the execution of the .NET application via the launched CLR profiler, assign to the .NET application, a category of a predetermined list of categories based on an analysis of the execution log of the .NET application, and determine whether the .NET application is categorized as being a malicious application.

In one exemplary aspect, a non-transitory computer-readable medium is provided storing a set of instructions thereon for categorization of applications created using the .NET program platform, wherein the set of instructions comprises: launching a CLR profiler upon launching of the .NET application, forming an execution log of the .NET application and adding information about events occurring during the execution of the .NET application via the launched CLR profiler, assigning to the .NET application, a category of a predetermined list of categories based on an analysis of the execution log of the .NET application, and determining whether the .NET application is categorized as being a malicious application.

In one aspect, the added information about events occurring during the execution of the .NET application includes byte representations of data downloaded into a random access memory.

In one aspect, the .NET application is placed in quarantine or removed from a memory of a computing device when the .NET application is recognized categorized as being malicious.

In one aspect, wherein, when the .NET application is categorized recognized as being malicious, all assemblies loaded into memory during the execution of the .NET application are also recognized as being malicious.

In one aspect, a loaded assembly is categorized recognized as being malicious only when the loaded assembly is not recognized as being trusted, the assembly being recognized as being trusted when an identifier of the file of the application of the assembly is stored in a database of trusted applications.

In one aspect, a usage of the .NET application is terminated when the .NET application is not categorized as being a trusted application.

In one aspect, the execution of the .NET application is restricted when the .NET application is categorized as being an untrusted application.

In one aspect, a loaded assembly is recognized categorized as being malicious only when the assembly is loaded into a same domain as the domain of the .NET application.

The categorization of the applications created using a CLR profiler may then be achieved. Namely, the .NET platform provides COM interfaces for the implementing of a profiler, and a dynamic library (DLL) making it possible to intercept function calls of the .NET application pertaining specifically to the execution of the application being analyzed.

The above simplified summary of example aspects serves to provide a basic understanding of the present disclosure. This summary is not an extensive overview of all contemplated aspects, and is intended to neither identify key or critical modules of all aspects nor diineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for categorization of applications created using the .NET program platform. Those of ordinary skill in the art will realize that the following description is illustrative only and is not intended to be in any way limiting. Other aspects will readily suggest themselves to those skilled in the art having the benefit of this disclosure. Reference will now be made in detail to implementation of the example aspects as illustrated in the accompanying drawings. The same reference indicators will be used to the extent possible throughout the drawings and the following description to refer to the same or like items.

In order to add clarity, terms used in describing aspects of the present disclosure are first provided herein.

A malicious application is an application able to cause harm to a computer or to the data of a user of a computer (in other words, of a computer system), for example, an Internet worm, a keylogger, a computer virus. The harm caused may be unlawful access to the computer resources, including the data being kept on the computer, for the purpose of theft, and also unlawful use of the resources, including for data storage, performance of calculations, and so on.

A trusted application is an application which does not cause harm to a computer or its user. A trusted application can be an application developed by a trusted software manufacturer, downloaded from a trusted source (such as a site listed in a database of trusted sites) or an application the identifier (or other data by which the application can be uniquely determined) of which (such as the hash sum of the application file) is kept in a database of trusted applications. The manufacturer's identifier, such as a digital certificate, may also be kept in the database of trusted applications.

An untrusted application is an application which is not trusted, but also not recognized as being malicious, for example by means of an antivirus application. An untrusted application may subsequently be recognized as being malicious, for example using an antivirus scan.

A malicious file is a file which is a component of a malicious application and contains program code (executable or interpretable code).

An untrusted file is a file which is a component of an untrusted application and contains program code (executable or interpretable code).

A trusted file is a file which is a component of a trusted application.

The predetermined categories of applications are at least the category of trusted applications, the category of untrusted applications, and the category of malicious applications.

An event occurring during the execution of an application created with the use of .NET (a .NET application) is "the calls for functions" (including the functions and methods of the .NET program platform) which are functions performed from the program code of that application during its execution. Because of the special features of the .NET platform, in the context of the description of the present disclosure, the terms function and method are considered as being identical. Examples of events may be the concatenation of strings (by calling the function System.String.Concat), the obtaining of a value of a string resource (by calling the function System.Resources.ResourceManager.GetString), and others.

A CLR profiler is a dynamic library recorded in an operating system as a COM object and containing an implementation of the interface ICorProfilerCallback. In yet another aspect, the CLR profiler contains an implementation of the interface ICorProfilerCallback2. In yet another aspect, the CLR profiler contains an implementation of other interfaces of profilers (such as ICorProfilerCallback7); details on the interfaces of profilers may be found in the document[1]. In general, a profiler is software designed for the profiling of an application, specifically the gathering of information on the execution of an application—the time for execution of the application and its separate parts, the data kept in RAM, the functions called during the execution and their arguments, and so forth.

[1] https://docs.microsoft.com/en-us/dotnet/framework/unmanaged-api/profiling/profiling-interfaces The processing of an event by a CLR profiler is the interception of an event occurring during the execution of the application using a callback function which is implemented by the CLR profiler itself.

An assembly (or .NET assembly)[2] is an executable PE file which contains common intermediate language (CIL) code.

Figure 3:
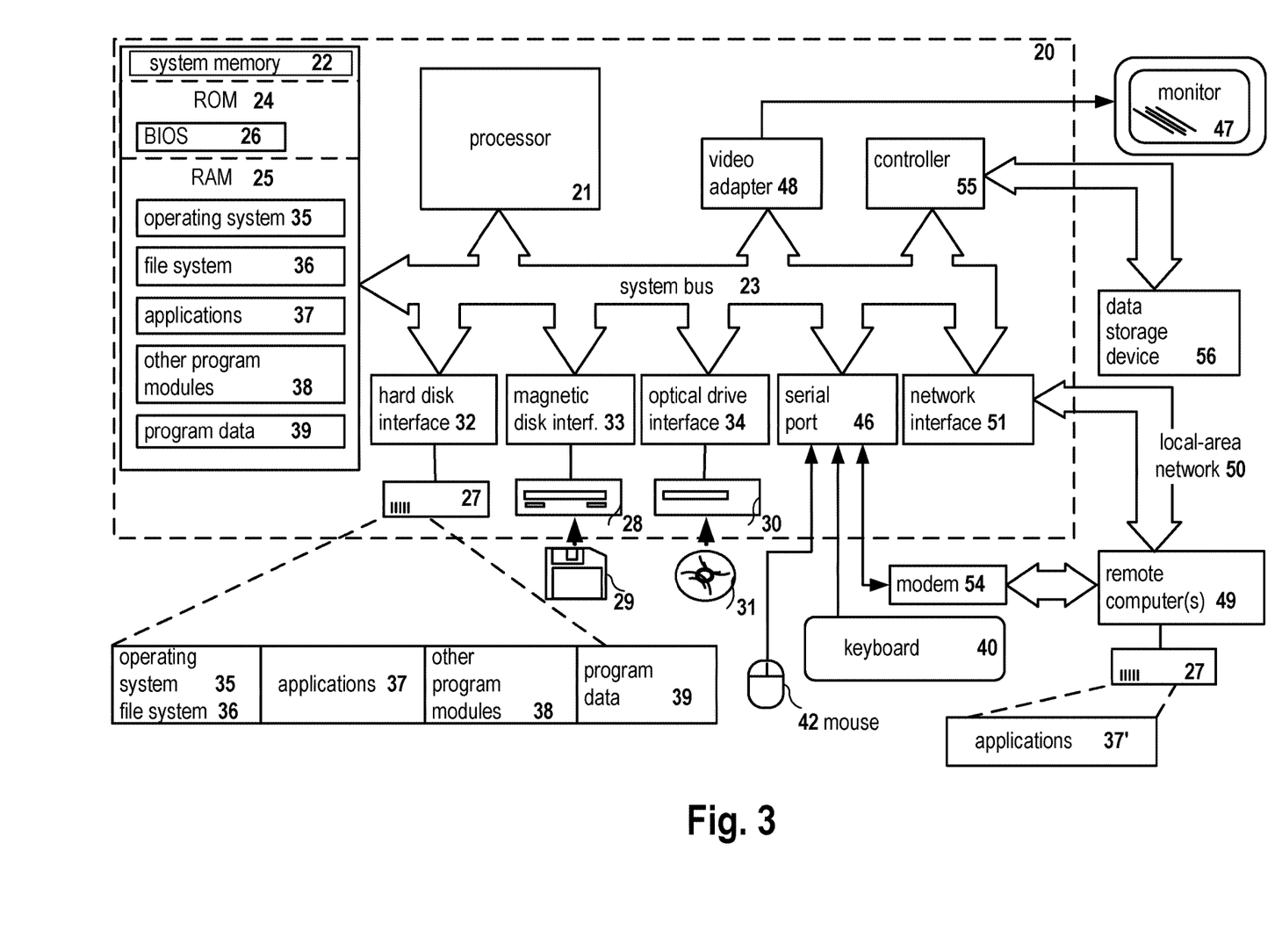
FIG. 3 presents an example of a general-purpose computer system on which aspects of the present disclosure can be implemented.

[2] https://msdn.microsoft.com/en-us/library/k3677y81(v=vs.90).aspx, https://msdn.microsoft.com/ru-ru/library/k3677y81(v=vs.110).aspx In the present disclosure, the modules of the system for categorization of .NET applications are understood as being actual devices, systems, components or groups of components realized with the use of hardware, such as application-specific integrated circuits (ASIC) or field-programmable gate arrays (FPGA) or, for example, in the form of a combination of software and hardware, such as a microprocessor system and a set of software instructions, as well as on neurosynaptic chips. The functionality of such modules of the system can be realized exclusively by hardware, and also in the form of a combination, where some of the functionality of the modules of the system is realized by software, and some by hardware. In some aspects, some of the modules or all of the modules may be executed on the processor of a general-purpose computer (such as is shown in FIG. 3). The system components may be realized in the confines of a single computing device or distributed among several interconnected computing devices.

Figure 1:
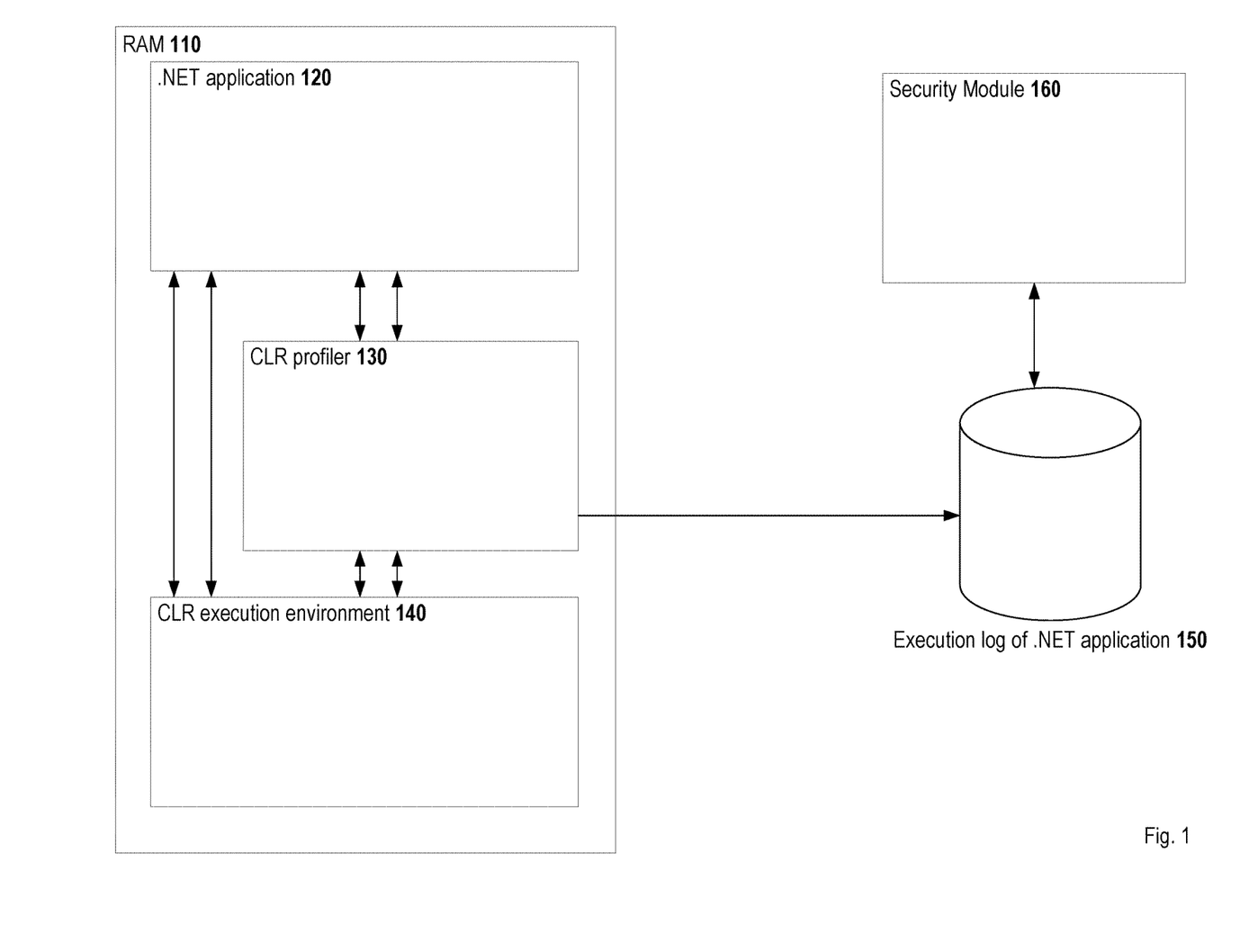
FIG. 1 is a block diagram illustrating an exemplary system for categorizing .NET applications.

FIG. 1 is a block diagram illustrating a system for categorization .NET applications. The system for categorization .NET applications consists: a CLR profiler 130, an execution log of the .NET application 150, and a security module 160, which are interconnected as shown in FIG. 1.

As was indicated above, the CLR profiler 130 is a dynamic library (DLL library) designed for the profiling of .NET applications, in other words those created with the use of the .NET program platform Framework. The .NET platform comprises two major components: a CLR (Common Language Runtime) execution environment and a library of .NET Framework types (.NET Framework Class Library). The CLR execution environment 140 affords the possibility of profiling applications with controllable code, namely .NET applications, using registered profilers such as the CLR profiler 140, implemented in the form of COM server libraries (COM server DLL). During the profiling, such libraries are loaded by the CLR execution environment 140 into the RAM 110; in the following description, the RAM 110 shall also denote the address space of the process launched from the .NET application 120 being profiled. It should be noted that the launching of a .NET application may be done either by a user of a computer system or by the security module 160 (for example, for the purpose of further analysis and categorization).

In one aspect, the registration of the CLR profiler 130 as a COM server library is done by the security module 160, and as the result of the registration the security module 160 obtains from the operating system (OS) the identifier (CLSID) of the registered COM object. For the loading of the CLR profiler 130 into the address space of the application being profiled, the security module 160 also specifies the necessary values for the environment variables COR_ENABLE_PROFILING and COR_PROFILER (the latter with indication of the identifier, such as CLSID, of the CLR profiler 130). In another aspect, the security module 160 also specifies the value of the environment variable COMPLUS_ProfAPI_ProfilerCompatibilitySetting (for example, the value "EnableV2Profiler"). The process of launching the CLR profiler 130 may differ depending on the version of the .NET program platform residing on the computer system. In general, for the launching of the CLR profiler 130 the security module 160 performs all actions prescribed for this by the .NET specification (for more details[3]). After performance of these steps by the security module 160, the CLR execution environment, upon loading the .NET application 120, loads into the RAM 110 the CLR profiler 130. Thus, the security module 160, though not explicitly, will carry out the launching of the CLR profiler 130 upon launching of the .NET application 120. It should be noted that the values of the environment variables may be specified either locally for the .NET application 120 or globally for the user of the computer system within which the components of the system for categorization of .NET applications are functioning, or for the computer system itself.

[3] https://docs.microsoft.com/en-us/dotnet/framework/unmanaged-api/profiling/profiling-overview Having been launched, and once located in the address space of the process of the .NET application 120 being profiled, the CLR profiler 130 gathers information on the execution of the .NET application 120 being profiled. The CLR profiler 130 is also able to form the execution log of the .NET application 150, created with the use of the .NET program platform, on the basis of the gathered information. In such an execution log of the .NET application 150 the CLR profiler 130 will add information about the events occurring during the execution of the .NET application 120. In one aspect, the information about an event includes:

the name (type) of the event, examples of names being:
    a function call event;
    an assembly load event;
    a domain load event;
    a class load event;
    an event pertaining to exceptional situations (exceptions);
    an event relating to JIT compilation;
    an event relating to an RPC (remote procedure call);
    some other event[4], information about which is provided by the CLR execution environment 140;

[4] https://docs.microsoft.com/en-us/dotnet/framework/unmanaged-api/profiling/icorprofilercallback-interface for function call events:
    the name of the function;
    the name of the arguments of the function;
    the values of the arguments of the function;
    the returnable value of the function;
for assembly load events:
    the name of the assembly;
    the body of the assembly (byte representation);
    a list of the types and methods described in the assembly.

It should be noted that the event of loading an assembly into the RAM 110 generally involves the calling of one of the following functions (methods) during the execution of the .NET application: Assembly.LoadModule, Assembly.Load, AppDomain.Load.

In general, the events occurring during the execution of a .NET application 120 are events, access to information about which is provided[5] by the CLR execution environment 140. In one aspect, such events are function calls being performed by the process launched from the .NET application 120. In yet another aspect, such functions are the methods of the .NET program platform (described in the .NET Framework platform, namely the .NET Class Library), whose calls are performed from the program code of the mentioned application 120 during its execution.

[5] https://docs.microsoft.com/en-us/dotnet/framework/unmanaged-api/profiling/cor-prf-monitor-enumeration It should be noted that information not directly related to certain occurring events may also be added to the execution log of the .NET application 150: for example, the presence in the RAM 110, specifically in the memory containing the image (loaded representation) of the .NET application 120—the address space of the process launched from the .NET application 120—of certain byte sequences, for example in the form of strings. Such information, in particular, may be character strings of the .NET application 120, relating in particular to the resources of the .NET application 120 or to the names of types or functions of this application 120.

In order to process the occurring events and add the information about the events, upon initialization of the CLR profiler 130 (specifically, after it is loaded into the RAM 110 by the execution environment 140) the CLR profiler 130 calls the function ICorProfilerInfo.SetEventMask, indicating as parameter, inter alia, the mask of the events to which the profiler 130 needs to respond. Examples of such events (namely, the designations of the corresponding events) are:

COR_PRF_MONITOR_NONE—to turn off the intercepting of events;
COR_PRF_MONITOR_ALL—to intercept any given event;
COR_PRF_MONITOR_ASSEMBLY_LOADS—to intercept the event of loading to and unloading from the RAM 110, specifically the address space of the process of the .NET application 120 being executed, of the .NET assemblies being performed by calls for the functions AssemblyLoad and AssemblyUnload, respectively;

COR_PRF_MONITOR_ENTERLEAVE—for the intercepting of events of calling functions and terminating the execution of the code of functions.

In one aspect, the parameter of the function SetEventMask is indicated as COR_PRF_MONITOR_ALL. In yet another aspect, the mentioned parameter is indicated as COR_PRF_MONITOR_ENTERLEAVE. In another aspect, the mentioned parameter is indicated as COR_PRF_MONITOR_ENTERLEAVE (binary "or") COR_PRF_MONITOR_ASSEMBLY_LOADS.

The execution log of the .NET application 150 formed by the above-described method is analyzed by the security module 160 for the categorization of the .NET application 120, method information about the events occurring during its execution and is added to the execution log of the .NET application 150. For this analysis by the security module 160 it is possible to use any methods known ordinarily in the art which allow an application to be assigned to one or another predetermined category on the basis of the execution log of the application. In one aspect, the security module 160 uses heuristic rules for the aforementioned analysis for the purpose of categorizing the .NET application 120. Examples of heuristic rules may be the following rules:

If an assembly load event has occurred, and also there are present in the RAM 110 the strings: "TVqQAAMAAAAEAAAA", "DeflateStream", "CreateDecryptor", "ToArray", "DecryptData", then the .NET application 120 is assigned to the category of malicious applications.

If the sequence of the following events has occurred:
  the event or several events of calls for a function of string formation, such as string concatenation (e.g., using the call String.Concat), the result of which may be used for access to the resources of the .NET application 120, an example of the result of such a concatenation being the string "RES" (for example, by concatenation of the strings "R", "E", "S"),
  the event of calling the function System.Reflection.Assembly.GetEntryAssembly,
  the event of calling the function System.Resources.ResourceManager.GetObject,
  then the .NET application 120 is assigned to the category of malicious applications.

If the sequence of the following events has occurred:
  the event of calling a function to add the .NET application 120 to the autolaunch of the computer system (such as the function RegistryKey.SetValue),
  the event of calling the function NewLateBinding.LateCall, whose arguments are:
  the object Scripting.FileSystemObject and the method Copyfile,
  or the object WScript.Shell and the method RegWrite, and also there are present in the RAM 110 byte sequences having the string representation "smtp" and "{Shift}-",
  then the .NET application 120 is assigned to the category of malicious applications.

If a sequence of events of calls for the following functions has occurred:
  System.Environment.get_UserName,
  System.Environment.get_MachineName,
  System.Environment.get_UserDomainName,
  System.Environment.get_Is64BitOperatingSystem,
  System.Environment.GetLogicalDrives,
  System.Environment.get_OSVersion,
  System.Net.NetworkInformation.NetworkInterface.GetIsNetworkAvailable,
  System.Net.Dns.GetHostName,
  System.Net.Dns.GetHostEntry,
  System.Net.WebClient.DownloadString,
  while the computer system in which the .NET application 120 is being executed is not a user's device, but rather for example a remote server, then the .NET application 120 is assigned to the category of malicious applications.

If the event of calling the function System.Security.Principal.WindowsPrincipal.IsInRole has occurred with the parameter 0x220 (which means a checking of whether the current user belongs to the group BUILTIN\Administrators), and also there is present in the RAM 110 a sequence of bytes having the string representation "KillAV", then the .NET application 120 is assigned to the category of malicious applications.

If an assembly load event has occurred, and the loaded assembly is recognized as being malicious, then the .NET application 120 is recognized as being malicious.

If the event of calling a function whose identifier (e.g., its name) is the identifier of one of the functions used only by trusted .NET applications has occurred, then the .NET application 120 is assigned to the group of trusted applications.

If none of the heuristic rules for assigning the .NET application 120 to the category of malicious or trusted applications was applied, then the .NET application 120 is assigned to the group of untrusted applications.

In one aspect, the harmfulness of an assembly (especially a loaded one) is determined if there is at least one match when comparing the identifier of the assembly (for example, the hash sum or, for example, the MVID—module version ID, the identifier of the assembly module) with the identifiers of known malicious assemblies which may be stored either in the security module 160 or on a remote server. In yet another aspect, the harmfulness of an assembly is determined by any other method ordinarily known in the art.

It is considered that a function is used only by trusted .NET applications if its identifier (for example, the name or the hash sum from the code of the function) is contained in a list of trusted functions. In yet another aspect, it is considered that a function is used only by trusted .NET applications if its identifier is not contained in a list of untrusted functions. A trusted function is a function used only by trusted applications (and not used by untrusted or malicious applications). An untrusted function is a function which is at least used by untrusted or malicious applications. The phrase "use of a function in an application" in the present context refers to a presence of a call for the function in the program code of the application. The lists described above may be stored either in the security module 160 or on the remote server to which it is connected, and contain the names of those and only those functions which are not encountered in known malicious .NET applications. Such lists may be formed and updated on a regular basis (for example, by the security module 160) by identifying functions (and their identifiers) of known malicious .NET applications and trusted .NET applications and adding these functions (and their identifiers) to one list or the other.

It should be noted that the rules given above are merely particular instances of heuristic rules which may be applied to the information kept in the execution log of the .NET application 150. In general, the security module 160 can make use of any other heuristic rules designed for the categorization of .NET applications with the use of information kept in the execution log of the .NET application 150, especially information obtained using the CLR profiler 130. After assigning a .NET application 120 to a particular category of applications, the security module 160 is able to perform actions aimed at ensuring the security of the computer system based on the result of the categorization.

In one aspect, if the security module 160 assigns the .NET application 120 to the category of malicious applications, then this application 120 is recognized as being malicious. In another aspect, this application (and specifically the files of the application, in particular the executable files) is placed by the security module 160 in quarantine or removed from the memory of the computing device, specifically from the data storage device (for example, a hard disk or solid state drive) of the computer system.

In another aspect, if the security module 160 does not assign the .NET application 120 to the category of trusted applications (for example, it is assigned to the category of untrusted ones), then the use of this application 120 is ceased by the security module 160 by terminating the process launched from the .NET application 120.

In yet another aspect, if the security module 160 assigns the .NET application 120 to the category of malicious applications, then all assemblies loaded into RAM 110 during the execution of the .NET application 120 are also recognized as being malicious. In yet another aspect, the loaded assemblies are only recognized as being malicious in the event that they are not trusted. In the present disclosure, "trusted" means specifically that the identifiers (such as the MD5 of the file of the application) of such assemblies are kept in a database of trusted applications, which may reside either in the security module 160 or on a remote server connected to the security module 160. In one aspect, such loaded assemblies are recognized as being malicious only if they were loaded into the same domain as the .NET application 120.

In yet another aspect, if the security module 160 assigns the .NET application 120 to the category of untrusted applications, then the security module 160 restricts the execution of the .NET application 120. By "restricted execution of an application" is meant a restriction or prohibition of the performance of certain actions by the .NET application, such as:
  prohibition on writing to certain areas of the data storage device (such as those relating to the system catalogs "c:\windows" or "c:\windows\system32");
  prohibition on accessing certain network addresses (such as known addresses used to carry out online payments or other banking operations, such as known network addresses of banking servers); and
  prohibition on modifying files which may contain documents (such as files with the extension doc, docx, pdf and so forth).

In yet another aspect, the security module 160 is able to transmit information on the result of the assigning of the .NET application 120 to a certain category to other computer systems. In particular, the security module 160 is able to transmit such information, for example the identifier of the .NET application 120 (such as the MD5 of the file) and its category to a security module located on another computer system (not shown in the figures), for example on the computing device of a certain user. The security module located on this computing device is able to save the information transmitted by the security module 160 and use it as well as the security module 160: for example, it can remove files of .NET applications which have been assigned to the category of malicious applications.

Figure 2:
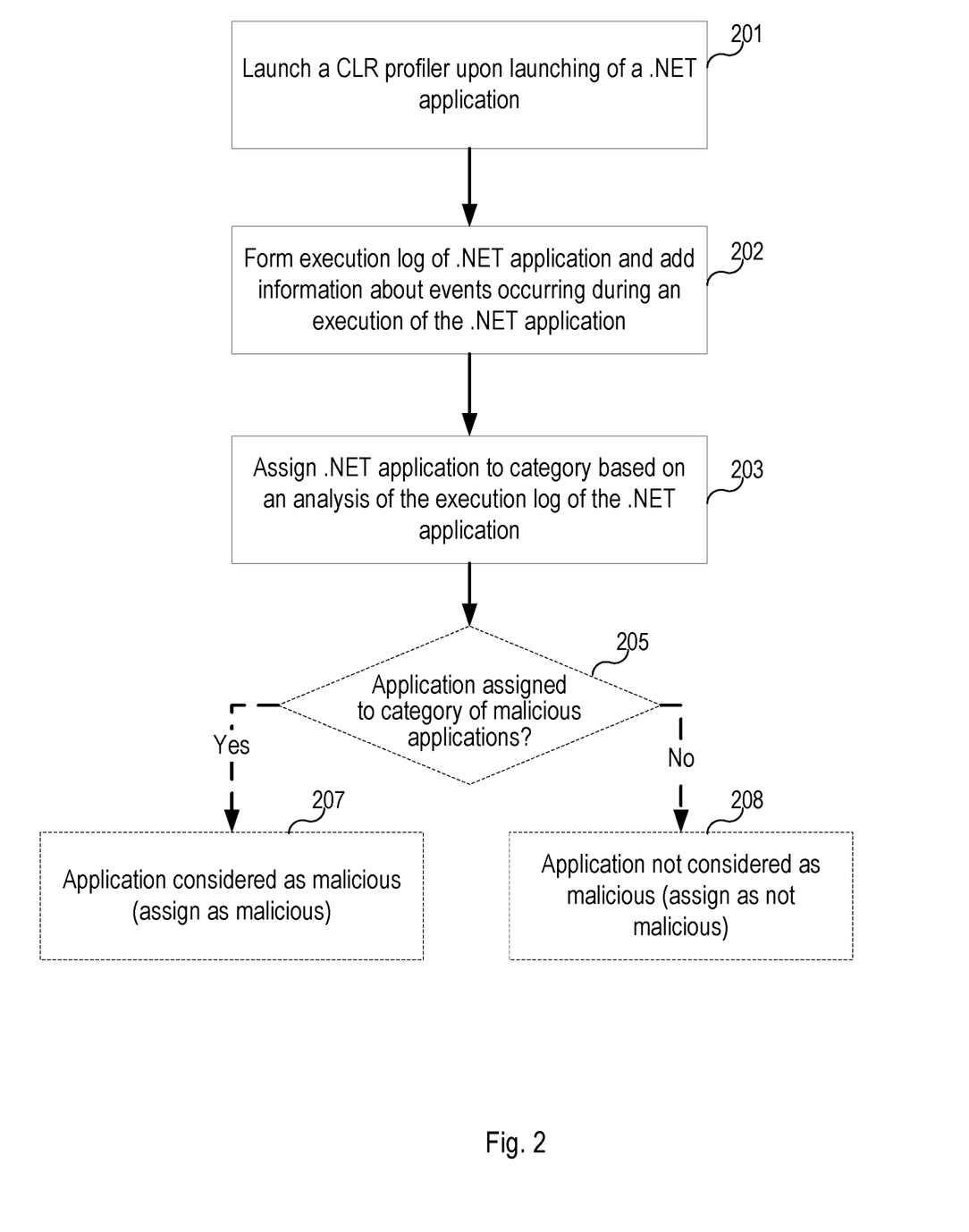
FIG. 2 is a flow diagram illustrating an exemplary method of categorizing .NET applications.

FIG. 2 is a flow diagram illustrating a structure of a method of categorizing .NET applications 120. In step 201, the security module 160 is used to launch the CLR profiler 130 after the launching of the .NET application 120. It should be noted that the launching of the CLR profiler 130 upon launching of the .NET application 120 does not occur explicitly, but rather specifically by registration of the CLR profiler 130 as a COM server library, and also by modification of the environment variables COR_ENABLE_PROFILIG and COR_PROFILER by the security module 160. In turn, the CLR execution environment 140, loaded into the RAM 110 upon launching of the .NET application 120, carries out the loading into memory 110 of the CLR profiler 130, since its CLSID is indicated by the security module 160 as the value of the environment variable COR_PROFILER. Then, in step 202, the CLR profiler is used to form the execution log of the .NET application 150. To this execution log of the .NET application 150, the CLR profiler 130 adds information about events occurring during the execution of the .NET application 120. In one aspect, said information about events includes the byte representation of the data loaded into the RAM 110. In one aspect of the present disclosure, such data is the assemblies being loaded. Then, in step 203, the security module 160 assigns the .NET application 120 to a category of a predetermined list of categories of applications on the basis of an analysis of the execution log of the .NET application 150. In one aspect, the security module 160 also checks, in step 205, whether the .NET application 120 has been assigned to the category of malicious applications.

In one aspect, when the .NET application is assigned to the category of malicious applications, then in step 207, the security module recognizes the .NET application 120 as being malicious. Otherwise, in step 208, the security module 160 does not consider recognizing said application 120 as being malicious.

FIG. 3 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between modules of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are powerindependent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned modules in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of categorizing a NET application, the method comprising: launching, a Common Language Runtime (CLR) profiler upon launching of the NET application; forming an execution log of the NET application and adding information about events occurring during an execution of the NET application via the launched CLR profiler; assigning to the NET application, a category of a predetermined list of categories based on an analysis of the execution log of the NET application; determining whether the NET application is categorized as being a malicious application, when the .NET application is categorized as being malicious, determining whether or not an identifier of a file of the application of a loaded assembly is stored in a database of trusted applications; and when the identifier of the file of the application of the loaded assembly is not stored in the database of trusted applications, categorizing the loaded assembly as untrusted and restricting the execution of the .NET application, wherein the restricting of the execution includes at least one of:
- prohibiting writing to an area of a data storage device, the area including those used by an operating system;
- prohibiting access to network addresses used for financial transactions while allowing access to other network addresses; and
- prohibiting modifications of files that contain documents.

2. The method of claim 1, wherein the .NET application is placed in quarantine or removed from a memory of a computing device when the .NET application is categorized as being malicious.

3. The method of claim 1, wherein, when the .NET application is categorized as being malicious, all assemblies loaded into memory during the execution of the .NET application are also recognized as being malicious.

4. The method of claim 1, wherein a usage of the .NET application is terminated when the .NET application is not categorized as being a trusted application.

5. The method of claim 1, wherein, the loaded assembly is categorized as being malicious when the .NET application is categorized as being malicious and the loaded assembly is loaded into a same domain as the domain of the .NET application.

6. A system of categorizing a .NET application, comprising: at least one processor configured to: launch a Common Language Runtime (CLR) profiler upon launching of the NET application; form an execution log of the NET application and add information about events occurring during an execution of the .NET application via the launched CLR profiler; assign, to the .NET application, a category of a predetermined list of categories based on an analysis of the execution log of the .NET application; determine whether the .NET application is categorized as being a malicious application; when the .NET application is categorized as being malicious, determine whether or not an identifier of a file of the application of a loaded assembly is stored in a database of trusted applications; and when the identifier of the file of the application of the loaded assembly is not stored in the database of trusted applications, categorize the loaded assembly as untrusted and restrict the execution of the .NET application, wherein the restricting of the execution includes at least one of:
- prohibiting writing to an area of a data storage device, the area including those used by an operating system;
- prohibiting access to network addresses used for financial transactions while allowing access to other network addresses; and
- prohibiting modifications of files that contain documents.

7. The system of claim 6, wherein the .NET application is placed in quarantine or removed from a memory of a computing device when the .NET application is categorized as being malicious.

8. The system of claim 6, wherein, when the .NET application is categorized as being malicious, all assemblies loaded into memory during the execution of the .NET application are also recognized as being malicious.

9. The system of claim 6, wherein a usage of the .NET application is terminated when the .NET application is not categorized as being a trusted application.

10. The system of claim 6, wherein, the loaded assembly is categorized as being malicious when the .NET application is categorized as being malicious and the loaded assembly is loaded into a same domain as the domain of the .NET application.

11. A non-transitory computer readable medium storing thereon computer executable instructions for categorizing a .NET application, including instructions for: launching a Common Language Runtime (CLR) profiler upon launching of the .NET application; forming an execution log of the .NET application and adding information about events occurring during an execution of the .NET application via the launched CLR profiler; assigning to the NET application, a category of a predetermined list of categories based on an analysis of the execution log of the NET application; determining whether the NET application is categorized as being a malicious application, when the NET application is categorized as being malicious, determining whether or not an identifier of a file of the application of a loaded assembly is stored in a database of trusted applications; and when the identifier of the file of the application of the loaded assembly is not stored in the database of trusted applications, categorizing the loaded assembly as untrusted and restricting the execution of the NET application, wherein the restricting of the execution includes at least one of:
- prohibiting writing to an area of a data storage device, the area including those used by an operating system;
- prohibiting access to network addresses used for financial transactions while allowing access to other network addresses; and
- prohibiting modifications of files that contain documents.

12. The non-transitory computer readable medium of claim 11, wherein the .NET application is placed in quarantine or removed from a memory of a computing device when the .NET application is categorized as being malicious.

13. The non-transitory computer readable medium of claim 11, wherein, when the .NET application is categorized as being malicious, all assemblies loaded into memory during the execution of the .NET application are also recognized as being malicious.

14. The non-transitory computer readable medium of claim 6, wherein a usage of the .NET application is terminated when the .NET application is not categorized as being a trusted application.

15. The non-transitory computer readable medium of claim 11, wherein, the loaded assembly is categorized as being malicious when the .NET application is categorized as being malicious and the loaded assembly is loaded into a same domain as the domain of the .NET application.

* * * * *